(12) United States Patent
Hasegawa

(10) Patent No.: US 6,608,664 B1
(45) Date of Patent: Aug. 19, 2003

(54) VIBRATION-PROOF LIQUID CRYSTAL DISPLAY HAVING MOUNTING END REGIONS OF LOWER RIGIDITY

(75) Inventor: Fumio Hasegawa, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/577,702

(22) Filed: May 23, 2000

(30) Foreign Application Priority Data

May 25, 1999 (JP) ............................................ 11-144524

(51) Int. Cl.⁷ ............................................ G02F 1/1335
(52) U.S. Cl. ............................................ 349/160; 349/60
(58) Field of Search ............................ 349/58, 60, 158, 349/160

(56) References Cited

U.S. PATENT DOCUMENTS 5,838,401 A * 11/1998 Uehara ........................ 349/58
6,169,592 B1 * 1/2001 Choi .......................... 349/124
6,243,147 B1 * 6/2001 Sano .......................... 349/58

FOREIGN PATENT DOCUMENTS

| JP | 9-329777 | 12/1997 |
| JP | H10-068935 | 3/1998 |
| JP | H10-232403 | 9/1998 |
| JP | H11-64860 | 3/1999 |
| KR | 1998-068741 | 10/1998 |

OTHER PUBLICATIONS

Japanese Office Action dated Mar. 4, 2003 together with English Language Translation.

* cited by examiner

Primary Examiner—Kenneth Parker
(74) Attorney, Agent, or Firm—Scully, Scott, Murphy & Presser

(57) ABSTRACT

Disclosed is a liquid crystal display having a housing; and a liquid crystal panel which has a first substrate and a second substrate each of which has a nearly line-symmetrical and planar form and which have a nearly equal surface area and at least one of which are transparent, the first substrate and second substrate being nearly parallel disposed sandwiching a liquid crystal composition layer. The first substrate is provided with mounting end regions that are extended outside from the end of the second substrate at the line-symmetrical position of the first substrate, so that the liquid crystal panel is fixed to the housing through the mounting end regions.

9 Claims, 5 Drawing Sheets

VIBRATION-PROOF LIQUID CRYSTAL DISPLAY HAVING MOUNTING END REGIONS OF LOWER RIGIDITY

FIELD OF THE INVENTION

This invention relates to a liquid crystal display, and more particularly to, a liquid crystal display that has enhanced vibration-proof characteristic and shock-proof characteristic, and that guarantees a quality of image by preventing the orientation characteristic of liquid crystal molecule from deteriorating even when the liquid crystal display is subject to a deformation by external stress.

BACKGROUND OF THE INVENTION

In conventional liquid crystal displays, the liquid crystal panel has been fixed to the housing by applying double-side adhesive tape or adhesive agent to a width, which is as short as 1 mm, from the edge of image display region in the liquid crystal panel to the end of the liquid crystal panel. However, in liquid crystal displays used in harsh conditions, such as liquid crystal display in automobile's navigation system and liquid crystal display in operating panel of industrial machine, the above fixing method does not give the satisfactory vibration-proof characteristic and shock-proof characteristic. Namely, there is a problem that the liquid crystal panel is dislocated or deformed due to vibration or shock, thereby a quality of image is deteriorated so that the display performance lowers.

Japanese patent application laid-open No.09-329777 (1997) discloses a liquid crystal display that offers a solution to the above problem. FIG. 1 shows an example of structure disclosed in Japanese patent application laid-open No.09-329777. In this structure, spaces $A_3$ and $A_4$ nearly sealed are provided by disposing frame-shaped elastic members 33 and 35 along the edge of front and back faces of a liquid crystal panel P, and the liquid crystal panel is fixed using the elasticity of the elastic members and the air-damping effect of the sealed spaces. Thus, the liquid crystal panel can be protected from being dislocated and deformed due to vibration and shock.

However, in the conventional structures including the above example, although they offer high vibration-proof characteristic and shock-proof characteristic in normal use, when static external stress such as user's operation force is applied to the liquid crystal display, there occurs a deformation in the liquid crystal panel. This is because, to such static deformation stress, the air-damping effect is not available.

Also, since the liquid crystal panel is fixedly bound by the elastic members, the deformation of the housing itself, which supports the liquid crystal panel indirectly, is likely to be transmitted to the liquid crystal panel. As a result, due to the static external stress applied to the liquid crystal display, the liquid crystal panel is subject to a deformation. If the liquid crystal panel is deformed, then disorder in orientation of liquid crystal molecule in the liquid crystal panel occurs and therefore causes part of light and shade like a wave pattern in the display region due to unevenness in the amount of light transmitted. Thus, in the conventional liquid crystal displays, there is a problem that the static external stress causes deterioration in the quality of image.

Further, in the conventional liquid crystal display, since the elastic members are disposed adjacent to the display region of liquid crystal panel, even a slight deformation is likely to be transmitted to the display region of liquid crystal panel through the elastic members supporting the liquid crystal panel. Therefore, part of light and shade may occur in the display region and the quality of image may deteriorate.

SUMMARY OF THE INVENTION

Accordingly, it is an object of the invention to provide a liquid crystal display that has enhanced vibration-proof characteristic and shock-proof characteristic, and that guarantees a quality of image by preventing the orientation characteristic of liquid crystal molecule from deteriorating even when the liquid crystal display is subject to a deformation by external stress.

According to the invention, a liquid crystal display, comprises:

a housing; and a liquid crystal panel which comprises a first substrate and a second substrate each of which has a nearly line-symmetrical and planar form and which have a nearly equal surface area and at least one of which are transparent, the first substrate and second substrate being nearly parallel disposed sandwiching a liquid crystal composition layer;

wherein the first substrate is provided with mounting end regions that are extended outside from the end of the second substrate at the line-symmetrical position of the first substrate, so that the liquid crystal panel is fixed to the housing through the mounting end regions.

In this invention, the mounting end regions composed of only the first substrate has a rigidity lower than part where the first and second substrates are overlapped to form an image display section with the liquid crystal composition layer sandwiched therebetween. Therefore, when the housing is deformed by static external stress, only the mounting end regions with the lower rigidity are deformed, thereby preventing the display section in the liquid crystal panel from being deformed. Further, owing to the gap provided between the liquid crystal panel and the housing, even when the housing is deformed by external stress, it can be avoided that the housing contacts the liquid crystal panel thereby causing a deformation in the liquid crystal panel. Also, by providing a sufficient adhesion width on the back surface of the extended part and securely fixing the liquid crystal panel to the housing with the adhesive means, it is avoided that the liquid crystal panel is dislocated or deformed due to vibration or shock.

Thus, in the liquid crystal display of the invention, against static weight, vibration or shock, the liquid crystal panel can be prevented from being dislocated or deformed. Namely, the quality of image in the liquid crystal display can be guaranteed even when static weight, vibration or shock is applied thereto.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
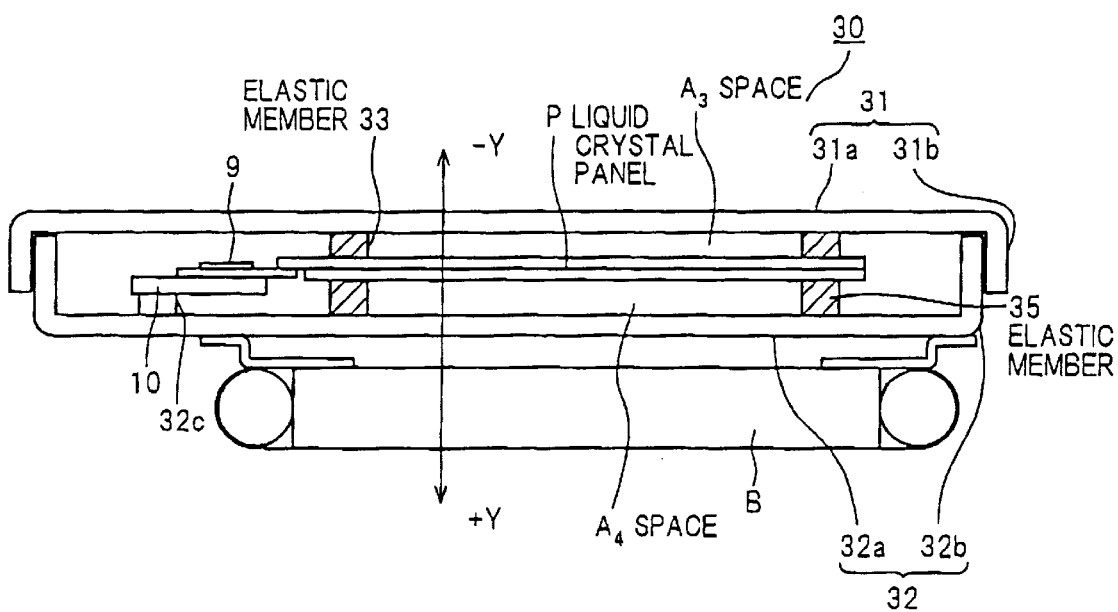
FIG. 1 is a cross sectional view showing the conventional liquid crystal display device.
Figure 2:
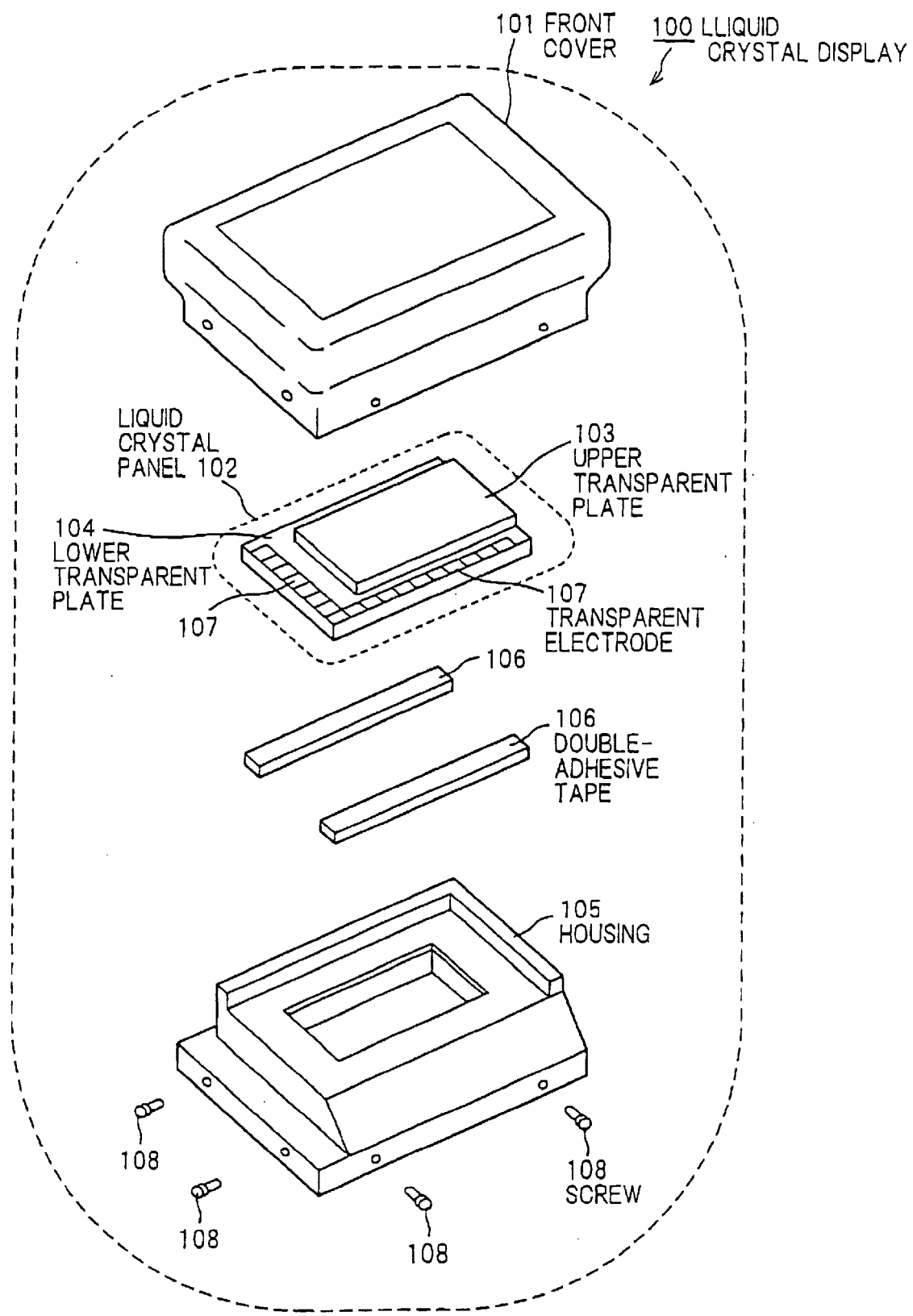
FIG. 2 is a perspective broken view showing a liquid crystal display in the preferred embodiment according to the invention.

FIG. 2 is a perspective broken view showing a liquid crystal display in the preferred embodiment according to the invention.

A liquid crystal display 100 in the invention is composed of a front cover 101 which covers the entire liquid crystal display 100, a liquid crystal panel 102, a housing 105 which fixedly supports the liquid crystal panel 102, double-side adhesive tapes 106 which fix the liquid crystal panel 102 to the housing 105, and screws 108 which fix the front cover 101 to the housing 105.

The liquid crystal panel 102 is composed of a rectangular upper transparent plate 103 and a rectangular lower transparent plate 104. Between the upper transparent plate 103 and the lower transparent plate 104, liquid crystal composition layer 109 is sandwiched. Further, around the liquid crystal composition layer 109, adhesive agent is coated in the form of a frame to seal the liquid crystal composition layer 109 and to make the upper transparent plate 103 and the lower transparent plate 104 unite nearly parallel.

Extensions (extended part, hereinafter also referred to as "flexible part") are formed extending the both line-symmetrical end regions along the longitudinal side in the lower transparent plate 104 outside from the longitudinal ends of the upper transparent plate 103. Also, another extension is formed extending one end region along the lateral (short) side in the lower transparent plate 104 outside from the lateral end of the upper transparent plate 103. Further, in one of the longitudinal extensions and the lateral extension of the lower transparent plate 104, transparent electrodes 107 to drive active devices in the liquid crystal composition layer 109 are formed.

Also, though not shown, the liquid crystal display 100 in this embodiment is provided with polarizing film attached to the outer surface of the liquid crystal panel 102, a print-circuit board to drive the liquid crystal panel 102, and flexible cables to connect between the print-circuit board and the liquid crystal panel 102.

Figure 3:
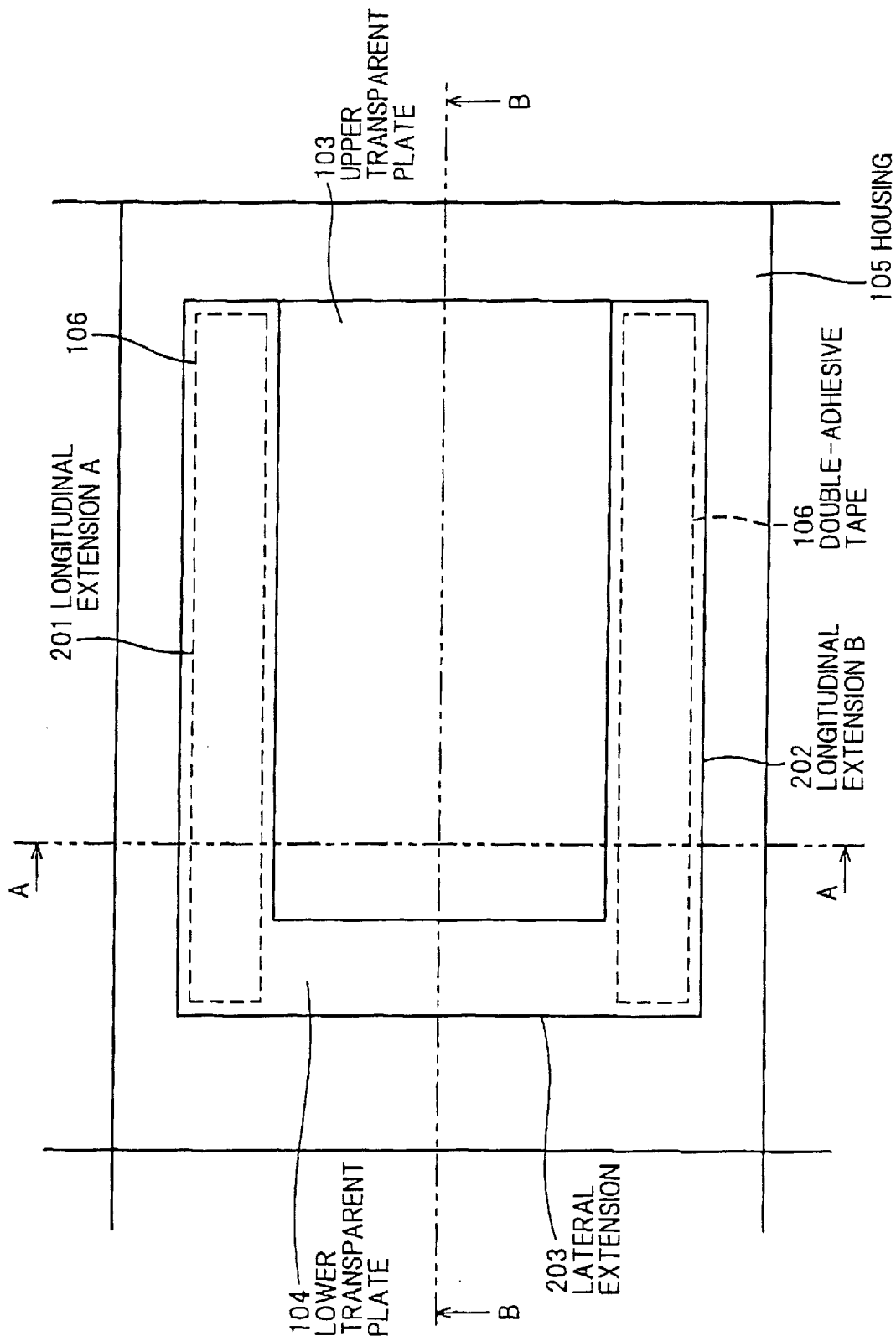
FIG. 3 is a plan view showing a liquid crystal panel 102 in FIG. 2, FIGS. 4(a) and (b) are cross sectional views cut along the line A—A in FIG. 3, and FIGS. 5(a) and (b) are cross sectional views cut along the line B—B in FIG. 3.

In FIGS. 3 and 4, the structure of the liquid crystal panel 102 is explained in detail.

FIG. 3 is a plan view showing one embodiment of the liquid crystal panel 102 in the invention. Longitudinal extension part A (201) and longitudinal extension part B (202) are formed extending the both line-symmetrical end regions along the longitudinal side in the rectangular lower transparent plate 104 outside from the longitudinal ends of the upper transparent plate 103. Also, lateral (short-side) extension part 203 is formed extending one end region along the lateral (short) side in the lower transparent plate 104 outside from the lateral end of the upper transparent plate 103.

Onto the back surface of the longitudinal extension part A (201) and longitudinal extension part B (202) in the lower transparent plate 104, double-side adhesive tapes 106 shown by dotted lines in FIG. 3 are attached in order to gain sufficient vibration-proof characteristic and shock-proof characteristic. Thereby, the liquid crystal panel 102 is securely fixed to the housing 105.

Figure 4A:
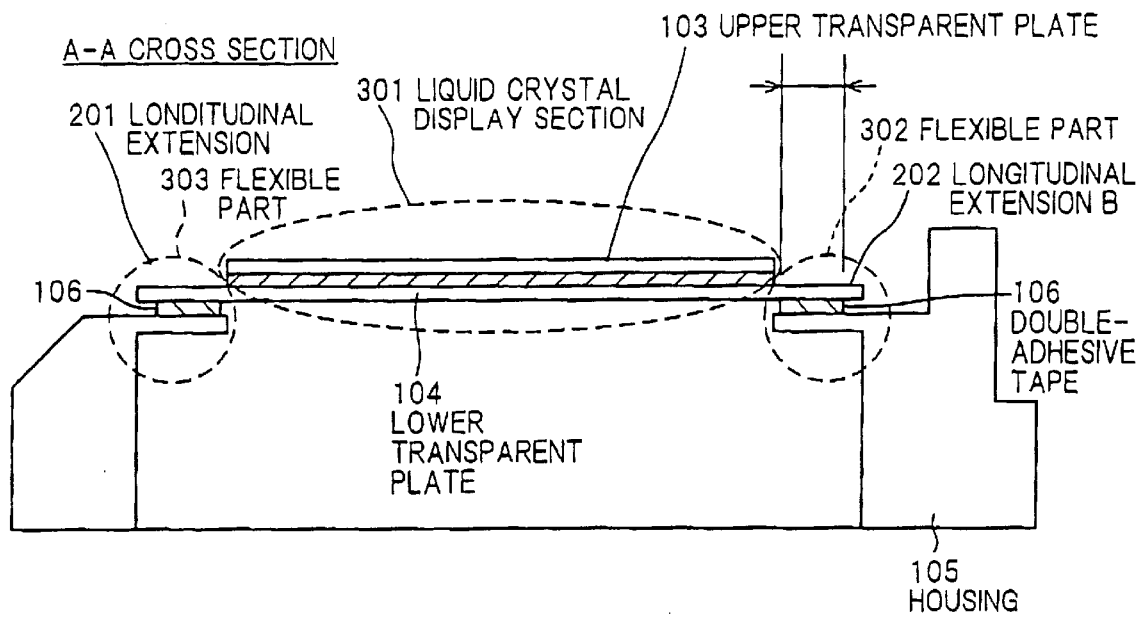

FIG. 4(a) is a cross sectional view cut along the line A—A in FIG. 3. Also, FIG. 4(b) is a cross sectional view cut along the line A—A, in a case that the liquid crystal display 100 is deformed by external stress.

In FIG. 4(a), compared with liquid crystal display part 301 in which the upper transparent plate 103 and the lower transparent plate 104 are overlapped, flexible parts 302 and 303 extend only as part of the lower transparent plate 104, and therefore, the mounting end regions have a thickness less than half that of the entire liquid crystal display parts 301. Consequently, the rigidity of the mounting end regions is lower than the rigidity of the entire liquid crystal display part 301.

Figure 4B:
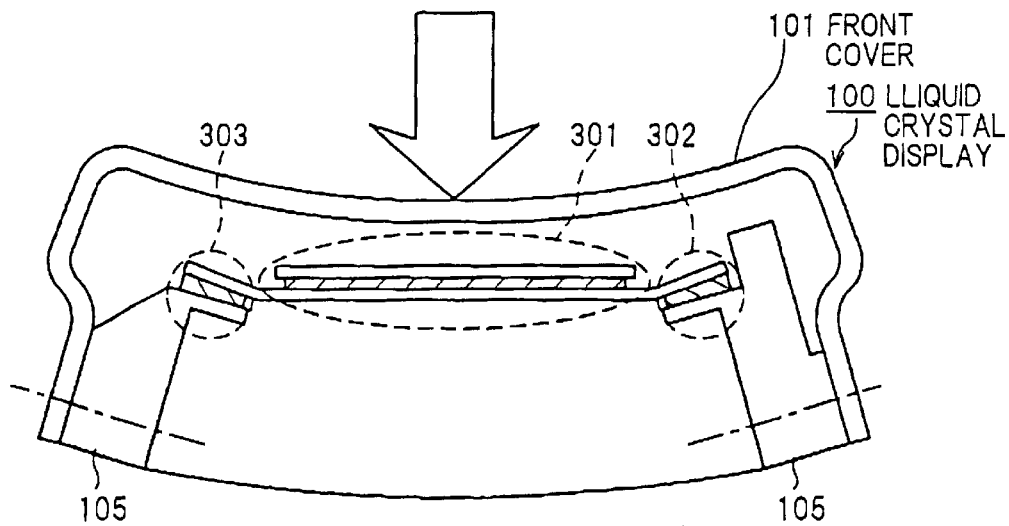

Therefore, even when the housing 105 is deformed by external stress as shown in FIG. 4(b), only the low-rigidity flexible parts 302 and 303 are subject to a deformation and the high-rigidity liquid crystal display part 301 is not subject to any deformation.

Also, at the extension parts 201 and 202 extending outside from the liquid crystal display part 301, the liquid crystal panel 102 and the housing 105 are jointed apart from the liquid crystal display part 301. Thus, the liquid crystal display 100 is structured so that the deformation or distortion of the housing 105 is not likely to be transmitted to the liquid crystal display part 301.

In FIGS. 4 and 5, a method of mounting the liquid crystal panel 102 to the housing 105 is explained in detail.

In FIG. 4, onto the back surface of the longitudinal extension part A (201) and longitudinal extension part B (202) in the lower transparent plate 104, the double-side adhesive tapes 106 which are mainly of acrylic resin are attached with adhesion width d of 2 mm in order to gain sufficient vibration-proof characteristic and shock-proof characteristic. Thereby, the liquid crystal panel 102 is securely fixed to the housing 105.

In an experiment, where 0.4 mm thick double-side adhesive tapes are attached with adhesion width d of more than 2 mm onto the back surface of the longitudinal extension part A (201) and longitudinal extension part B (202) in the lower transparent plate 104, it is proved that a shock-proof strength of 100 G which is necessary for onboard liquid crystal display devices can be obtained.

Meanwhile, in this embodiment, the width of the longitudinal extension part A (201) and longitudinal extension part B (202) where the double-side adhesive tapes 106 are attached is set to be 3 mm, taking the processing or attaching precision of the double-side adhesive tape 106 into account. However, in a liquid crystal display device that is mainly intended to be miniaturized, the width of extended part can be reduced to 2 mm. In other words, the width d of the double-side adhesive tape 106 can be allowed to be 2 mm or more, and the width of extended part can be optionally chosen according to the object of product.

Also, if a sufficient shock-proof strength can be obtained, then it is not always necessary to extend the two longitudinal sides in the lower transparent plate 104 to be fixed thereto and, alternatively, the liquid crystal panel 102 may be fixed to the housing 105 with the two lateral (short) sides extended. Further, it is not always necessary to form the extended part along the entire longitudinal or lateral side in the transparent plate, and, alternatively, part of the longitudinal or lateral side may be extended to fix the liquid crystal panel 102 to the housing 105.

Also, it is not always necessary to use the double-side adhesive tapes 106 to fix the liquid crystal panel 102 to the housing 105, Alternatively, adhesive agent maybe used if it can yield a sufficient adhesive power.

Figure 5A:
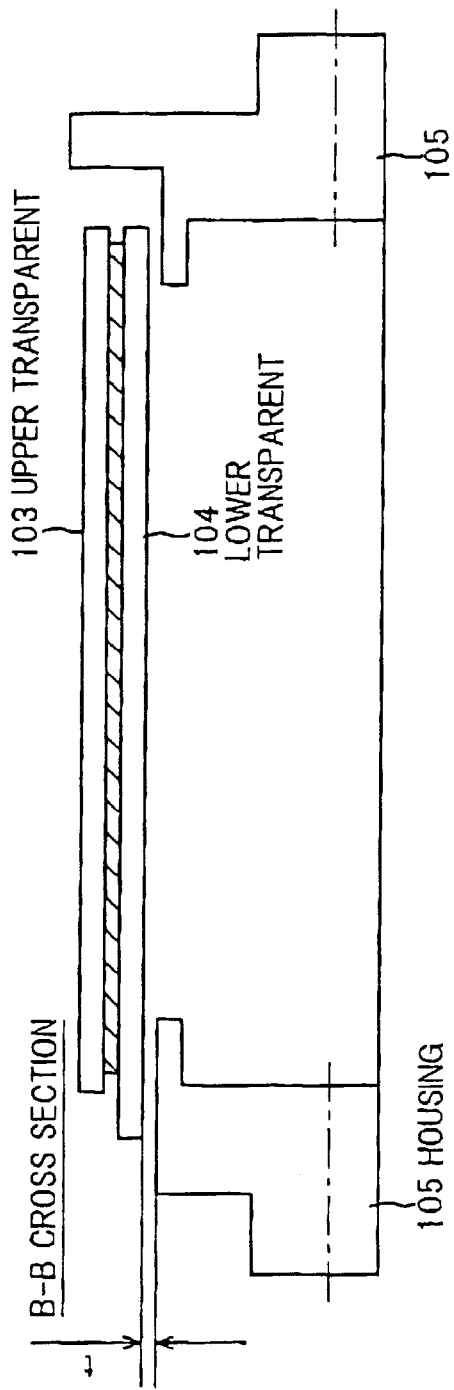
Figure 5B:
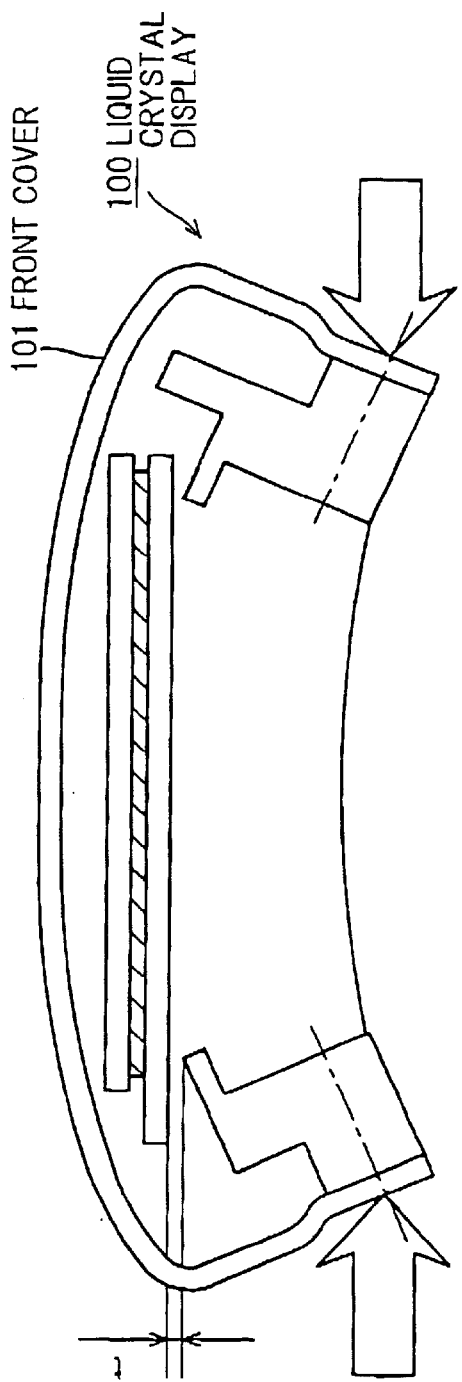

FIG. 5(a) is a cross sectional view cut along the line B—B in FIG. 3. Also, FIG. 5(b) is a cross sectional view cut along the line B—B in FIG. 3, in a case that the liquid crystal display 100 is deformed by external stress.

Between the lower transparent plate 104 and the housing 105, there is provided a gap t. Owing to the gap t provided between the lower transparent plate 104 and the housing 105, even when the housing 105 is deformed by external stress, it can be avoided that the housing 105 contacts the liquid crystal panel 102 thereby causing a deformation in the liquid crystal panel 102.

Meanwhile, in this embodiment, the gap t is set to be 0.4 mm. However, through experiment, it is proved that the amount of deformation yielded in the housing 105 is about 0.3 to 0.4 mm for a weight of 500 gram applied to the front cover 101 and about 1 mm for a weight of 1000 gram applied thereto.

In general, force applied when the switch on liquid crystal display 100 is operated by user is around 500 gram. Therefore, when the gap t is set to be 0.4 mm, it is avoided that the housing 105 contacts the liquid crystal panel 102 due to a deformation yielded in the housing 105.

Further, force applied when the user operates it strongly especially under severe conditions is around 1000 gram. For a liquid crystal display used under such severe conditions, the gap t only has to be set to be 1 mm.

Meanwhile, this invention is not limited to the above embodiment, all modifications or alterations, described below, within the range that the object of the invention can be attained is included in the invention.

For example, the form of liquid crystal panel is not limited to rectangular one, and may have various shapes such as circular, elliptical, polygonal, heart-shaped and star-shaped. Thus, the various shapes according to the use of liquid crystal display can be optioned. Also, in the embodiment the liquid crystal panel is composed of two transparent plates, but especially the lower plate does not necessarily have to be transparent.

Further, means for fixing the liquid crystal panel to the housing may be composed of an elastic member such as a rubber member.

In the liquid crystal display in the embodiment, the liquid crystal panel is securely fixed to the housing, and therefore a deformation or dislocation in the liquid crystal panel due to external stress, vibration or shock can be prevented. Thereby, a breakage, in the liquid crystal panel or a disconnection in flexible cables to connect between the print-circuit board and the liquid crystal panel can be prevented. In other words, the life duration of use in the liquid crystal display can be extended and the reliability of liquid crystal display can be enhanced.

Also, in the embodiment the double-side adhesive tapes are used to fix the liquid crystal panel to the housing. This allows the number of components to be reduced and the assembling of liquid crystal display to be made easily, comparing with the assembling by using an elastic member such as a rubber member, Also, since the processing of double-side adhesive tape is easier than the processing of elastic member such as a rubber member, the liquid crystal display can be further easily made. Namely, the manufacturing cost of liquid crystal display can be reduced.

Advantages of the Invention

In this invention, enhanced vibration-proof characteristic and shock-proof characteristic can be obtained by extending the two longitudinal sides of lower transparent plate outside, providing a sufficient adhesion width on the back surface of the extended part, and securely fixing the liquid crystal panel to the housing with the double-side adhesive tapes. Namely, even when the liquid crystal display is subject to vibration or shock, the liquid crystal panel is not dislocated or deformed. Thus, the quality of image in liquid crystal display can be guaranteed.

Further, in this invention, by providing the flexible part outside the display region of liquid crystal panel and jointing the flexible part to the housing, even when the liquid crystal display is deformed by external stress and the housing is thereby deformed, the display region is not subject to any deformation while only the flexible part having a rigidity lower than the liquid crystal panel is deformed. Namely, even when the liquid crystal display is deformed, it is avoided disorder in orientation of liquid crystal molecule in the liquid crystal panel occurs and therefore causes part of light and shade like a wave pattern in the display region due to unevenness in the amount of light transmitted. Thus, the quality of image in liquid crystal display can be further guaranteed.

Although the invention has been described with respect to specific embodiment for complete and clear disclosure, the appended claims are not to be thus, limited but are to be construed as embodying all modification and alternative constructions that may be occurred to one skilled in the art which fairly fall within the basic teaching here is set forth.

What is claimed is:

1. A liquid crystal display, comprising:
   a housing; and
   a liquid crystal panel which comprises a first substrate, a second substrate and a liquid crystal composition layer,
   said first substrate and said second substrate partially overlapping and sandwiching said liquid crystal composition layer to provide a display section;
   said first substrate having mounting end regions that are extended outside from the end of said second substrate, said liquid crystal panel being fixed to said housing by said mounting end regions,
   said mounting end regions being composed of only, and integral with, the first substrate,
   said mounting end regions of said first substrate having a rigidity lower than that of the portion of said liquid crystal panel where said first and second substrates overlap, and external stress to the entire liquid crystal display panel is absorbed by deformation of said mounting end regions of said first substrate.

2. A liquid crystal display, according to claim 1, wherein:
   said first substrate and second substrate have a rectangular form.

3. A liquid crystal display, according to claim 1, wherein:
   said second substrate is of transparent material and is disposed at the display side of said liquid crystal panel.

4. A liquid crystal display, according to claim 1, wherein:
   said first substrate and second substrate are of transparent material.

5. A liquid crystal display, according to claim 1, wherein:
   said liquid crystal panel is fixed to said housing with an adhesive means disposed sandwiched between said mounting end regions and said housing.

6. A liquid crystal display, according to claim 1, wherein:
   said first substrate is provided at two opposite sides with mounting end regions that are extended outside from ends of said second substrate, and
   said liquid crystal panel is fixed to said housing through said mounting end regions at said two opposite sides, while a gap is provided between said first substrate and said housing at two other opposite sides.

7. A liquid crystal display, according to claim 6, wherein:
   said adhesive means is double-sided adhesive tapes or adhesive agent.

8. A liquid crystal display, according to claim 6, wherein:
   said gap is 0.3 to 1 mm.

9. The liquid crystal display according to claim 1, wherein:
   said housing has a hollow part on its upper surface corresponding to said display section.

* * * * *